United States Patent [19]

Shimada

[11] 3,914,790

[45] Oct. 21, 1975

[54] FOUR-CHANNEL STEREO APPARATUS FOR SWITCHING BETWEEN TWO CHANNEL AND FOUR CHANNEL INPUTS

[75] Inventor: Shojiro Shimada, Tokyo, Japan

[73] Assignee: Sony Corporation, Tokyo, Japan

[22] Filed: Dec. 13, 1973

[21] Appl. No.: 424,306

[30] Foreign Application Priority Data

Dec. 29, 1972 Japan .......................... 48-3987[U]

[52] U.S. Cl. .................................................. 360/63
[51] Int. Cl.² .......................................... G11B 15/12
[58] Field of Search ...................................... 360/63

[56] References Cited

UNITED STATES PATENTS

| | | | |
|---|---|---|---|
| 3,684,835 | 8/1972 | Orban | 179/1 GQ |
| 3,730,532 | 5/1973 | Miyamoto | 360/63 |
| 3,761,628 | 9/1973 | Bauer | 179/1 GQ |

*Primary Examiner*—Bernard Konick
*Assistant Examiner*—Alan Faber
*Attorney, Agent, or Firm*—Lewis H. Eslinger; Alvin Sinderbrand

[57] ABSTRACT

A four-channel signal is presented via four independent input terminals and a four-pole switch to four recording heads in a magnetic recording and reproducing device. Two poles of the switch are also connected to receive a matrixed four-channel signal combined into two composite signals to be recorded by two of the magnetic heads. A four-pole output switch connects signals reproduced by the heads to four amplifier and speaker systems as discrete signals. Alternatively, if the signal was recorded as two composite signals, two of the poles of the output switch apply these signals to a decoder in which they are transformed into four discrete signals to be connected to the amplifier and speaker systems. Additional switches connect signals from the input terminals to the amplifier and speaker systems while the signals are being recorded to enable the signals to be monitored.

6 Claims, 2 Drawing Figures

FOUR-CHANNEL STEREO APPARATUS FOR SWITCHING BETWEEN TWO CHANNEL AND FOUR CHANNEL INPUTS

BACKGROUND OF THE INVENTION

1. Field Of The Invention

This invention relates to the field of four-channel stereo systems and particularly to a combined system capable of recording and reproducing four-channel discrete signals or a matrixed signal having two composite channels.

2. The Prior Art

There is a continuing interest in recording and reproducing stereophonic sound with increasing realism. The mere reproduction of two audio channels from speaker systems ideally located in front of the listener and somewhat to the listener's left and right as the ideal home reproduction systems is giving way to the realization that in an auditorium the sound each listener hears not only is from the front of the auditorium but is also reflected from the rear of the room. This sound is related to the direct sound from the front but has a different intensity and frequency spectrum, depending on the acoustical characteristics of the auditorium.

Additional realism can be obtained in stereo reproduction by providing not only the two front main speakers or speaker systems but two additional speakers or speaker systems behind the listener. These rear speakers produce sound waves that can be combined with the sound waves from the front speakers to give a listener in a relatively small room a sensation more nearly like that of hearing the same sound in a large auditorium.

At the present time, there are several systems for transmitting and utilizing four-channel signals. In one system, the four channels of information are carried over four separate conductors, recorded as separate signals, and reproduced as separate signals. Alternatively, the signals may be combined in a matrix circuit so that the signal that represents sound from the left front and the left rear are combined in one composite signal and signals that represent the right front signal and the right rear signal are combined in a second composite signal. These two composite signals may then be carried over two conductors and recorded on two channels, but before they are reproduced, the must be decoded to separate the two sets of composite signals into four discrete signals. It is desirable to be able to handle both matrixed signals and discrete signals in one reproducing device, but in order for this to be done satisfactorily by a consumer who is not expert in electronic technology, it must be possible to switch from discrete operation to matrixed operation easily and quickly.

It is one of the objects of the present invention to provide a simple switching circuit combined with recording and reproducing apparatus to make it easy to switch from operating in response to a discrete four-channel signal to operating in response to a matrixed four-channel signal. Further objects will become apparent after studying the following specification together with the drawings.

SUMMARY OF THE INVENTION

In accordance with the present invention a four-channel magnetic tape recording and reproducing device is provided with a four-pole input switch and a four-pole output switch. The input switch provides means to connect four input terminals of the recording device to four individual system input terminals to receive and record a four-channel signal presented to the system in the form of four discrete signals. Two of the poles of the input switch are also connected to a double input terminal to receive a matrixed four-channel signal presented in the form of two composite signals. Another four-pole switch is connected to the output of the reproducing section of the recording and reproducing device and is also connected to four separate reproducing amplifiers and speakers. In addition, two of the poles of the output switch are connected to a decoder. These poles are connected in the reproducing device to reproduce the two tracks on which a matrix signal was recorded, and the decoder transforms into four discrete signals, the two sets of composite signals that make up the matrixed signal. These discrete signals are connected by switching means to the four amplifiers and speakers to be produced as the desired four separate signals.

Additional switching means may be provided so that when incoming signals are being recorded, they may also be applied to the amplifiers and speakers to be reproduced in order to monitor what is being recorded.

DETAILED DESCRIPTION OF THE INVENTION

Figure 1:
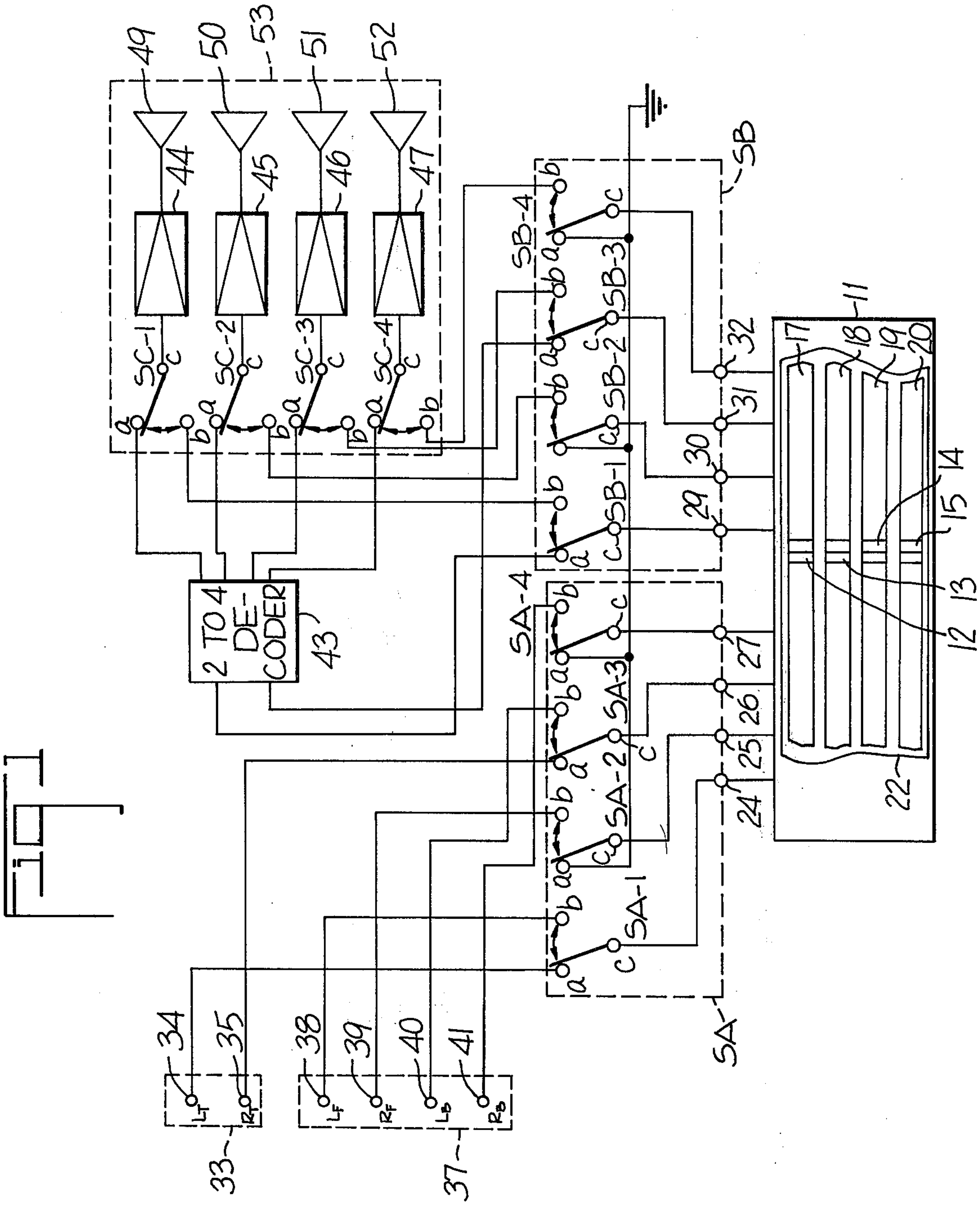
FIG. 1 is a block diagram of a four-channel stereo system according to the present invention.

FIG. 1 includes a four-channel magnetic recording and reproducing device 11 including four magnetic heads 12–15, placed to record and play back information on four tracks 17–20 of a magnetic tape 22. The recording and reproducing device 11 has four input terminals 24–27 and four output terminals 29–32. Recording and reproducing devices of this type having provisions for recording and reproducing four information channels on a magnetic tape are well known in the art and need not be described in detail.

The signals to be applied to the device 11 are obtained by way of either a two-channel input device 33 that has two input terminals 34 and 35 or a four-channel input device 37 that has four input terminals 38–41. The four input terminals 24–27 of the device 11 are connected, respectively, to the arms of a four-pole double-throw switch SA, the poles of which are identified as SA-1 through SA-4. Each pole has a fixed terminal *a* and a fixed terminal *b* and the arm of each of the poles SA-1 through SA-4 can be connected either to its respective *a* terminal or its *b* terminal. The *a* terminals of the poles SA-1 and SA-3 are connected, respectively, to the input terminals 34 and 35 to receive information from two channels.

This information may be in the form of previously encoded sound signals in which, for example, signals for the left channel are applied to the input terminal 34 and signals for the right channel are applied to the input terminal 35. Information applied to the input terminals 34 and 35 is recorded by the heads 12 and 14 on the tracks 17 and 19 of the tape 22. The *a* terminals of the poles SA-2 and SA-4 are connected directly to ground so that no undesired noise signals will be applied to the device 11 through these poles when the arms of all of the poles SA-1 through SA-4 are connected to their *a* terminals.

The respective *b* terminals of the poles SA-1 through SA-4 are connected to the input terminals 38–41 to receive four separate channels of information. These may be, typically, information corresponding to the left front channel applied to the input terminal 38, information corresponding to the right front channel applied to the input terminal 39, information corresponding to the left rear channel applied to the input terminal 40, and information corresponding to the right rear channel applied to the input terminal 41. These signals are not combined into a lesser number of signals but are separately recorded by means of the respective recording heads 12–15 on the tracks 17–20 of the tape 22.

When information recorded on the tape 22 is to be played back, the reproduced signals are made available at the output terminals 29-32. These terminals are connected, respectively, to four poles SB-1 through SB-4 of a four-pole double-throw switch SB. This switch is similar to the switch SA in that it has an *a* terminal and a *b* terminal for each of the poles. The *a* terminals of the poles SB-1 and SB-3 are connected to a standard decoder 43 that changes two composite signals into four discrete signals. The decoder 43 has four output terminals connected to *a* terminals of four poles SC-1 through SC-4 of a third four-pole double-throw switch SC. The respective arms of the four poles SC-1 through SC-4 are connected to the inputs of four powered amplifiers 44–47 that supply audio power signals to separate speaker systems 49–52 appropriately located in the listening area 53.

When a matrixed four-channel signal is being reproduced by the device 11, only the poles SB-1 and SB-3 are used and the *a* terminals of the other two poles SB-2 and SB-4 are connected to ground. The two composite signals that make up the matrixed signal are connected by way of the *a* terminals of the poles SB-1 and SB-3 to the decoder 43, which decodes them into four discrete signals. These signals are connected through the *a* terminals and arms of the switch SC to the amplifiers 44–47.

When four discrete signals are being reproduced by the device 11, there is an output signal at each of the terminals 29–32, and these four output signals are applied to the four poles SB-1 through SB-4 of the switch SB. In that case the arms of these four poles are connected to their *b* terminals which are connected, respectively, to the *b* terminals of the poles SC-1 through SC-4 of the switch SC. The four discrete signals then pass through the poles SC-1 through SC-4 to the amplifiers 44 through 47. Thus, the recording and reproducing device 11 can be easily switched to accommodate, as input signals, either four discrete channels or two composite channels and to provide similar output signals in which the four discrete channels are applied directly to amplifiers for sound reproduction. For recording a matrixed four-channel signal the switch SA should be set at its *a* terminals. For playback of a matrixed signal, the switches SB and SC should be set at their *a* terminals. For recording and playing back a four-channel discrete signal, the switches SA-SC are set at their *b* terminals. Thus, all of the switches SA-SC can be connected to a single two-position control marked, for example, MATRIXED in one position and DISCRETE in the other position. A separate control could set the device 11 for either recording or playback operation.

Figure 2:
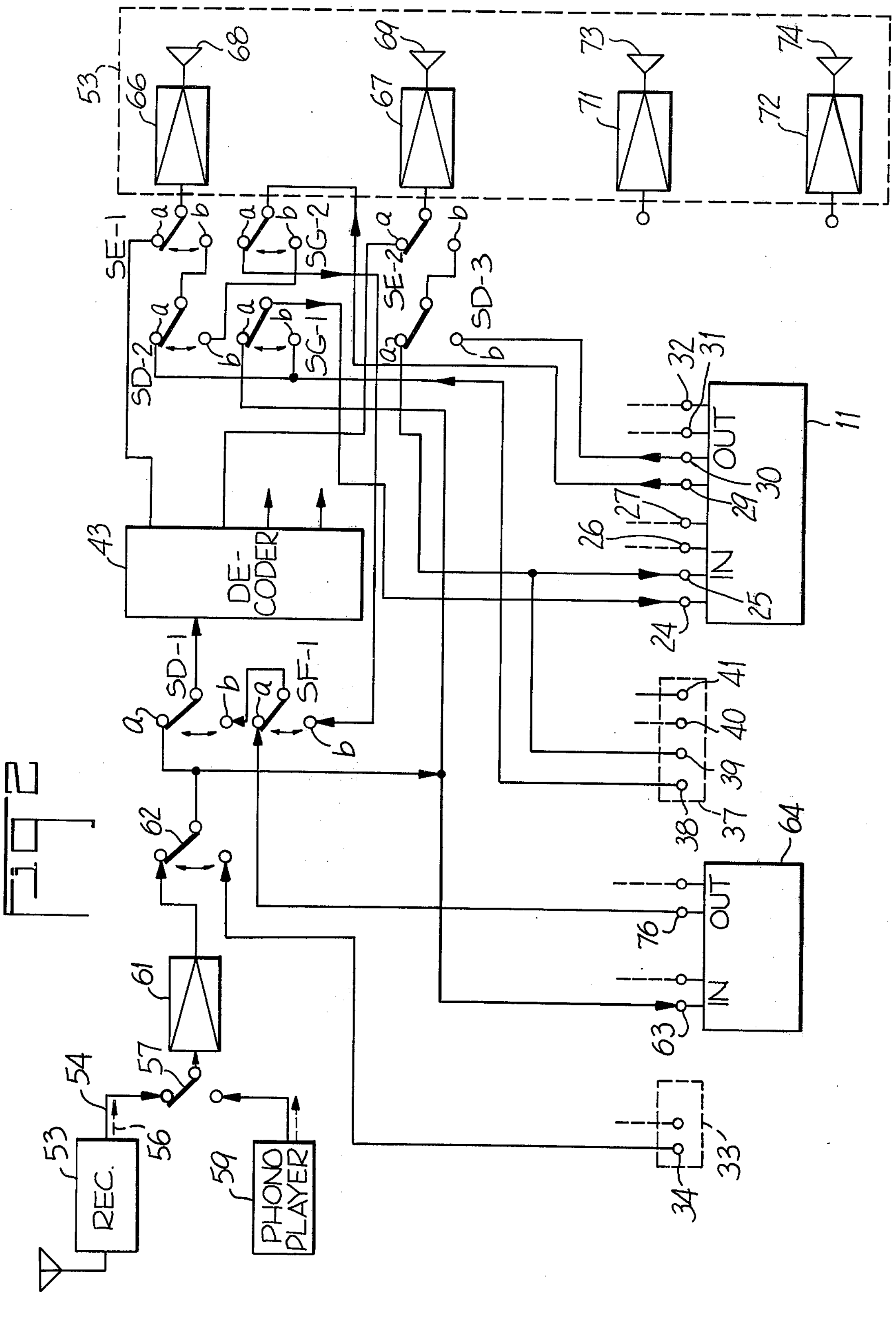
FIG. 2 is a block diagram of an alternative arrangement of the four-channel system according to the present invention.

FIG. 2 shows a system in which either a matrixed four-channel signal or a four-channel discrete signal or a standard two-channel stereo signal may be recorded and played back or may be applied directly to appropriately placed producing devices. The system in FIG. 2 includes a receiver 53 capable of receiving stereophonic signals. The receiver is indicated as having a single output terminal 54 but, in fact, it has two terminals, the second terminal 56 being indicated in dotted lines. The system throughout FIG. 2 is described with respect to only one channel corresponding to the output terminal 54 and it is to be understood that the circuits and switches all have twice as many contacts and arms as are shown, so that they are capable of handling a second channel. For example, the output terminal 54 is connected to one terminal of a switch 57 that is indicated as a single-pole, double-throw switch but is in fact a double-pole, double-throw switch. The second pole is not shown since the operation would be exactly the same as the pole that is shown.

The other input terminal of the switch 57 is connected to an output terminal 58 of a phonograph 59 and the arm of the switch 57 is connected to the input section of an amplifier 61. The output of the amplifier 61 is connected to one terminal of a switch 62 the other terminal of which is connected to an input device 33 of the type shown in FIG. 1. Specifically, the input terminal 34 of this device is connected to the second input terminal of the switch 62.

The arm of the switch 62 is connected to the *a* terminal of one pole SD-1 of a multipole switch and is also connected to an input terminal 63 of a two-channel recording and playback device 64. The arm of the switch pole SD-1 is connected to an input terminal of the decoder 43 that is capable of decoding a matrixed four-channel signal that has been encoded in two channels. This decoder has four output terminals for four discrete signals, two of which are connected to the *a* terminals of two poles SE-1 and SE-2 of a four-pole double-throw switch. The arms of the poles SE-1 and SE-2 are connected to the input circuits of two amplifiers 66 and 67 which, in turn, actuate speaker systems 68 and 69. The complete system includes two additional amplifiers 71 and 72 that supply signals to two speaker systems 73 and 74, and the connections between the amplifiers 71 and 72 and the decoder 43 are of the same type as for the amplifiers 66 and 67.

The circuit described to this point is capable of reproducing four-channel signals that were originally broadcast or recorded or presented as matrixed signals.

The system in FIG. 2 also includes a double-pole, double-throw switch SF of which only the pole SF-1 is shown. The *a* terminal of this pole is connected to an output terminal 76 of the two-channel recording and reproducing device 64, and the arm of the pole SF-1 is connected to the *b* terminal of the pole SD-1 of the switch SD. Thus, any signal from the receiver 53 or the phonograph 59 or the input device 33, could be recorded in the two-channel device 64 by passing through the switch 62 and the input terminals 63 of the device 64. The device 64 may be used only for regular two-channel stereo signals. Such two-channel signal could then be played back by setting the arm of the pole SF-1 in position shown and placing the arm of the switch pole SD-1 in the opposite position from that shown so that the arm of the pole SD-1 would be in contact with its *b* terminal and would thus transmit through to the decoder 43 the two-channel signal obtained from the reproducing section of the recording and reproducing device 64. If regular two-channel stereo signals were recorded in the device 64, the decoder could be arranged to supply signals only to the amplifiers 66 and 71 or it could produce a synthetic four-channel signal and present it as four discrete signals to the amplifiers 66, 67, 71, and 72.

The system in FIG. 2 also includes the same input device 37 as in FIG. 1 with its separate input terminals 38–41 to supply four discrete information signals. Connections are shown for only two of the input terminals 38 and 39, the connections for the other two terminals 40 and 41 being of identical nature. The terminal 38 is connected to the *a* terminal of a second pole SD-2 of the switch SD and to the *b* terminal of a pole SG-1 of a multi-pole switch SG. The input terminal 39 is connected directly to the input terminal 25 of the recording and reproducing device 11 and to the *a* terminal of another pole SD-3 of the switch SD. The arms of the switch poles SD-2 and SD-3 are connected to the *b* terminals of the switch poles SE-1 and SE-2. When the arms of the switch SD are connected to their *a* terminals and the arms of the switch SE are connected to their respective *b* terminals, the amplifiers 66 and 67 are energized directly by signals applied to the input terminals 38 and 39. Signals applied to the other two input terminals 40 and 41 are similarly connected to the amplifiers 71 and 72. Thus, the system in FIG. 2 provides means for reproducing sound directly from the signals applied to the input device 37 as four discrete components, or through the switch 62 as a matrixed four-channel signal or a standard two-channel stereo signal.

The four discrete signals may also be recorded in the recording section of the device 11. The signal applied to the input terminal 39 is connected directly to the input terminal 25 of the device 11. The signal applied to the terminal 38 may be connected to the input terminal 24 by actuating the switch SG so that its arms are in contact with their respective *b* terminals. The arm of the pole SG-1 is connected directly to the input terminal 24, and when the switch is so actuated, input signals applied to the input terminal 38 will be transmitted to the terminal 24 of the device 11.

At the same time. if the switch SD is kept in the condition such that the arm of the pole SD-2 is in contact with its *a* terminal, the signal from the input terminal 38 may be reproduced by the amplifier 66 and the speaker system 68 to monitor what is being recorded in the recording and playback device 11. The signal applied to the input terminal 39 will pass through the *a* terminal of the pole SD-3 and be applied to the amplifier 67 by way of the pole SE-2 to be reproduced from the speaker system 69.

After a four-channel discrete signal has been recorded on the four tracks 17–20 on the tape 22 in the recording and reproducing device 11, it may be played back by suitably actuating the switches SD, SE, and SG, The arm of a pole SG-2 of the multi-pole switch SG is connected directly to the output terminal 29 of the recording and reproducing device 11. When the switch SG is actuated so that its poles are in contact with their respective *b* terminals, the output signal from the terminal 29 will be applied through the pole SG-2 to the *b* terminal of the pole SD-2. If the arm of the pole SD-2 is then connected to its *b* terminal and the arm of the pole SE-1 is likewise connected to its *b* terminal, the signal from the output terminal 29 will pass through to the amplifier 66 and on to the speaker 68. The output terminal 30 of the device 11 is connected by way of the *b* terminal of the pole SD-3 and the *b* terminal of the pole SE-2 to the amplifier 67. The output terminals 31 and 32 are connected to the amplifiers 71 and 72 in the same way as the terminals 29 and 30 are connected to the amplifiers 66 and 67.

The four-channel recording and reproducing device 11 can also be used to record and reproduce matrixed signals presented in a two-channel encoded composite signal format. Such signals will be those that pass through the switch 62, the arm of which is connected to the *a* terminal of the pole SG-1 of the switch SG. The arm of this pole is connected to the input terminal 24 of the device 11 so that encoded signals from one of the two channels can enter the input terminal 24 and be recorded in the device 11. Information from the other channel of such an encoded two-channel signal will simultaneously be applied to the input terminal 26 by way of a circuit identical with that through which the signal is applied to the input terminal 24.

When such a two-channel matrixed signal is to be reproduced, the output terminal 29 that corresponds to the input terminal 24 supplies one of the encoded signals to the arm of the pole SG-2 of the switch SG. If this arm is connected to its *a* terminal and the pole SF-1 is connected to its *b* terminal and the arm of the pole SD-1 is also connected to its *b* terminal, the signal from the output terminal 29 will be connected to the decoder 43 to be decoded into two of the discrete signals and applied by way of the poles SE-1 and SE-2 to the amplifiers 66 and 67 and from there to the speakers 68 and 69.

What is claimed is:

1. A sound reproducing apparatus comprising:

a first input device having two input terminals for supplying two respective composite signals which together constitute a matrixed four-channel signal;

a second input device having four input terminals for supplying four respective discrete signals;

a magnetic tape recording and reproducing device including a magnetic tape, four magnetic heads for recording and reproducing signals in respective tracks on said tape, four input terminals for applying signals to be recorded to said four heads, respectively, and four output terminals for deriving reproduced signals from said four heads, respectively;

first switch means operative for respectively connecting said two input terminals of said first input device to two of said input terminals of said recording and reproducing device for recording of said two composite signals by the two respective heads in the corresponding two tracks on said tape;

means for respectively connecting said four input terminals of said second input device to said four input terminals of said recording and reproducing device for recording of said four discrete signals by said four heads in the corresponding tracks on said tape;

four sound reproducing means;

two-channel to four-channel decoding means having two input terminals and four output terminals and being operative to provide four decoded discrete signals at said four output terminals, respectively, of said decoding means upon the reception of said two composite signals at said two input terminals, respectively, of the decoding means;

second switch means having a first position, in which the two output terminals of said recording and reproducing device which correspond to said two heads are respectively connected to said two input terminals of the decoding means for supplying said two composite signals, as reproduced by said two heads, to said decoding means, and a second position, in which said four output terminals of the recording and reproducing device are connected to four respective conductors;

and third switch means having a first position, in which said four output terminals of said decoding means are respectively connected to said four sound reproducing means for operation of the latter by said four decoded discrete signals, and a second position, in which said four conductors are respectively connected to said four sound reproducing means for operation of the latter by said four discrete signals as reproduced by said four heads.

2. A sound reproducing apparatus according to claim 1; in which said first switch means is constituted by a double-throw switch having four poles, each of said poles has an arm connected to a respective one of said four input terminals of the recording and reproducing device and first and second terminals engaged by said arm in first and second positions, respectively, of said first switch means, two of said poles have said first terminals thereof respectively connected to said two input terminals of said first input device, and said four poles have said second terminals thereof respectively connected to said four input terminals of said second input device so as to constitute, in said record position of said first switch means, said means for connecting said four input terminals of the second input device to said four input terminals of the recording and reproducing device.

3. A sound reproducing apparatus according to claim 1; in which said second switch means is constituted by a double-throw switch having four poles, each of said poles has an arm connected to a respective one of said four output terminals of the recording and reproducing device and first and second terminals engaged by said arm in said first and second positions, respectively, of said second switch means, two of said poles have said first terminals thereof respectively connected to said two input terminals of the decoding means, and said four poles have said second terminals thereof respectively connected to said four conductors; said third switch means is constituted by an additional double-throw switch having four poles; and each of said poles of said additional double-throw switch has an arm connected to a respective one of said four sound reproducing means, a first terminal engaged by said arm in said first position of said third switch means and being connected with a respective one of said four output terminals of the decoding means, and a second terminal engaged by said arm in said second position of said third switch means and being connected to a respective one of said four conductors.

4. A sound reproducing apparatus according to claim 1; in which said first switch means is constituted by a double-throw switch having at least two poles, each of said two poles includes an arm connected with a respective one of said four intput terminals of said recording and reproducing device and first and second terminals which are selectively engaged by said arm in first and second positions of said first switch means, means for connecting said first terminal of each of said poles to a respective one of said two input terminals of said first input device, and means connecting said second terminal of each of said poles to a respective one of said four input terminals of said second input device; and in which the other two of said four input terminals of the second input device are connected directly to respective input terminals of said recording and reproducing device.

5. A sound reproducing apparatus according to claim 1; further comprising additional switch means for connecting said two input terminals of said first input device to said two input terminals of the decoding means so that, with said first switch means operative for achieving the recording of said two composite signals in said two tracks on the tape and said third switch means in said first position thereof, said decoding means can be simultaneously operative to provide said four decoded discrete signals which are applied through said third switch means to said four sound reproducing means for monitoring during said recording of the two composite signals.

6. A sound reproducing apparatus according to claim 1; further comprising additional switch means for connecting said four input terminals of said second input device with said four sound reproducing means, respectively, through said third switch means in said second position of the latter for monitoring of said four discrete signals from said second input device during said recording of such signals in said corresponding tracks on the tape.

* * * * *